US012773370B2

(12) United States Patent
Park et al.

(10) Patent No.: US 12,773,370 B2
(45) Date of Patent: Oct. 27, 2026

(54) MASSAGE APPARATUS

(71) Applicant: SAMSUNG ELECTRONICS CO., LTD., Suwon-si (KR)

(72) Inventors: Sunggyun Park, Suwon-si (KR); Taein Eom, Suwon-si (KR); Chanyoung Park, Suwon-si (KR); Jiho Jeong, Suwon-si (KR); Daesung Ki, Suwon-si (KR); Taeseob Lim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 741 days.

(21) Appl. No.: 18/206,497

(22) Filed: Jun. 6, 2023

(65) Prior Publication Data

US 2024/0082103 A1 Mar. 14, 2024

Related U.S. Application Data

(63) Continuation of application No. PCT/KR2023/006405, filed on May 11, 2023.

(30) Foreign Application Priority Data

Sep. 8, 2022 (KR) ........................ 10-2022-0114539

(51) Int. Cl.
*A61H 15/00* (2006.01)

(52) U.S. Cl.
CPC . *A61H 15/0078* (2013.01); *A61H 2015/0035* (2013.01); *A61H 2201/0107* (2013.01);
(Continued)

(58) Field of Classification Search
CPC ...... A61H 15/00–02; A61H 2201/0149; A61H 1/00–0296; A61H 23/00–06;
(Continued)

(56) References Cited

U.S. PATENT DOCUMENTS 10,849,811 B2 12/2020 Nakata et al.
2005/0090770 A1 * 4/2005 Chen .................. A61H 15/0078 601/102
(Continued)

FOREIGN PATENT DOCUMENTS

CN 107126350 A * 9/2017 ............. A61H 7/007
CN 109248054 A * 1/2019 ............. A61H 7/007
(Continued)

OTHER PUBLICATIONS

Translation of CN 107126350. Accessed from PE2E-Search on Mar. 24, 2026. (Year: 2017).*
(Continued)

*Primary Examiner* — Paige Kathleen Bugg
(74) *Attorney, Agent, or Firm* — CANTOR COLBURN LLP

(57) ABSTRACT

Provided is a massage apparatus including: a module drive motor; a module motion shaft provided to rotate by a driving force of the module drive motor; a motion guider provided to move in an extension direction of the module motion shaft as the module motion shaft rotates; a tilt drive motor; a tilt drive shaft arranged in parallel with the module motion shaft, and provided to rotate by a driving force of the tilt drive motor; a rotation axis tilting member coupled to the tilt drive shaft to rotate together with the tilt drive shaft, the rotation axis tilting member including a tilting portion having a rotation axis inclined with respect to the tilt drive shaft; and a roller bracket rotatably supporting a massage roller and connected to the motion guider and the rotation axis tilting member.

12 Claims, 17 Drawing Sheets

(52) U.S. Cl.
CPC ................ *A61H 2201/0149* (2013.01); *A61H 2201/1215* (2013.01); *A61H 2201/149* (2013.01); *A61H 2201/1669* (2013.01); *A61H 2201/1676* (2013.01)

(58) Field of Classification Search
CPC ...... A61H 2201/1215; A61H 2201/149; A61H 2201/1669; A61H 2201/1676
USPC ....... 601/24–26, 49–52, 86, 90, 98, 115–116
See application file for complete search history.

(56) References Cited

U.S. PATENT DOCUMENTS

| | | | | |
|---|---|---|---|---|
| 2009/0124940 | A1 | 5/2009 | Nishio et al. | |
| 2010/0081972 | A1 | 4/2010 | Kan et al. | |
| 2010/0274162 | A1 | 10/2010 | Evans | |
| 2016/0113835 | A1 * | 4/2016 | Tan | A47C 7/40<br>601/116 |
| 2022/0241135 | A1 * | 8/2022 | Wang | A61H 7/007 |

FOREIGN PATENT DOCUMENTS

| | | | | | |
|---|---|---|---|---|---|
| CN | 110115677 | A | | 8/2019 | |
| JP | H11299859 | A | | 11/1999 | |
| JP | 2001258972 | A | | 9/2001 | |
| JP | 2003038591 | A | | 2/2003 | |
| JP | 3564723 | B2 | | 9/2004 | |
| JP | 2010082064 | A | | 4/2010 | |
| JP | 2015142648 | A | | 8/2015 | |
| KR | 20050115280 | A | | 12/2005 | |
| KR | 20080024526 | A | | 3/2008 | |
| KR | 20130003261 | A | | 1/2013 | |
| KR | 2020130003261 | U | | 6/2013 | |
| KR | 20170142873 | A | | 12/2017 | |
| KR | 101882655 | B1 | | 7/2018 | |
| KR | 20200131798 | A | | 11/2020 | |
| KR | 102317414 | B1 | * | 10/2021 | C09D 133/00 |
| WO | WO-2020111645 | A1 | * | 6/2020 | A61H 23/006 |
| WO | WO-2022065785 | A1 | * | 3/2022 | A61H 15/0078 |

OTHER PUBLICATIONS

Translation of CN 109248054. Accessed from PE2E-Search on Mar. 24, 2026. (Year: 2019).*
Translation of KR 102317414. Accessed from PE2E-Search on Mar. 24, 2026. (Year: 2021).*
Translation of WO 2020/111645. Accessed from PE2E-Search on Mar. 24, 2026. (Year: 2020).*
Translation of WO 2022/065785. Accessed from PE2E-Search on Mar. 24, 2026. (Year: 2022).*
International Search Report for International Application No. PCT/KR2023/006405; International Filing Date May 11, 2023; International Search Report Mail Date Aug. 31, 2023; 10 Pages.

* cited by examiner

MASSAGE APPARATUS

CROSS-REFERENCE TO RELATED APPLICATION(S)

This application is a continuation application, claiming priority under § 365(c), of an International application No. PCT/KR2023/006405, filed on May 11, 2023, which is based on and claims the benefit of a Korean patent application number 10-2022-0114539, filed on Sep. 8, 2022, in the Korean Intellectual Property Office, the disclosure of which is incorporated by reference herein in its entirety.

TECHNICAL FIELD

The present disclosure relates to a massage apparatus.

BACKGROUND

A massage apparatus is an apparatus for providing a massage to a user. The massage apparatus may be implemented in a structure such as a chair on which a user may be seated.

In general, a massage apparatus may include a massage module for providing a massage to a user, a frame for supporting the user, and a frame cover covering the frame to provide a soft tactile sensation to the user. The frame cover may be formed of leather or fabric.

The massage module for providing a massage to a user's body may be disposed inside the massage apparatus. When the massage area of the massage module is fixed, it is difficult to provide appropriate massage to multiple users having various physiques.

SUMMARY

One aspect of the disclosure provides a massage apparatus including a massage module that includes a massage roller with a variable massage area structure.

One aspect of the disclosure provides a massage apparatus including a massage module that has an expanded range of massage.

The technical objectives of the disclosure are not limited to the above, and other objectives may become apparent to those of ordinary skill in the art based on the following description.

A massage apparatus according to an aspect of the disclosure includes: a module drive motor, a module motion shaft provided to rotate by a driving force of the module drive motor; a motion guider provided to move in an extension direction of the module motion shaft as the module motion shaft rotates; a tilt drive motor, a tilt drive shaft arranged in parallel with the module motion shaft, and provided to rotate by a driving force of the tilt drive motor; a rotation axis tilting member coupled to the tilt drive shaft to rotate together with the tilt drive shaft, the rotation axis tilting member including a tilting portion having a rotation axis inclined with respect to the tilt drive shaft; and a roller bracket rotatably supporting a massage roller and connected to the motion guider and the rotation axis tilting member, wherein the massage roller is configured to move along the extension direction of the module motion shaft within a first moving range in accordance with a moving range of the motion guider, and move within a second moving range wider than the first moving range in response to rotation of the tilting portion.

According to one aspect of the disclosure, a massage apparatus including a massage module that includes a massage roller with a variable massage area structure can be provided.

According to one aspect of the disclosure, a massage apparatus including a massage module that has an expanded range of massage can be provided.

The effects of the present disclosure are not limited to the above-described effects, and effects not described may be clearly understood by those of ordinary skill in the art from the present specification and the accompanying drawings.

MODES OF THE DISCLOSURE

Figure 1:
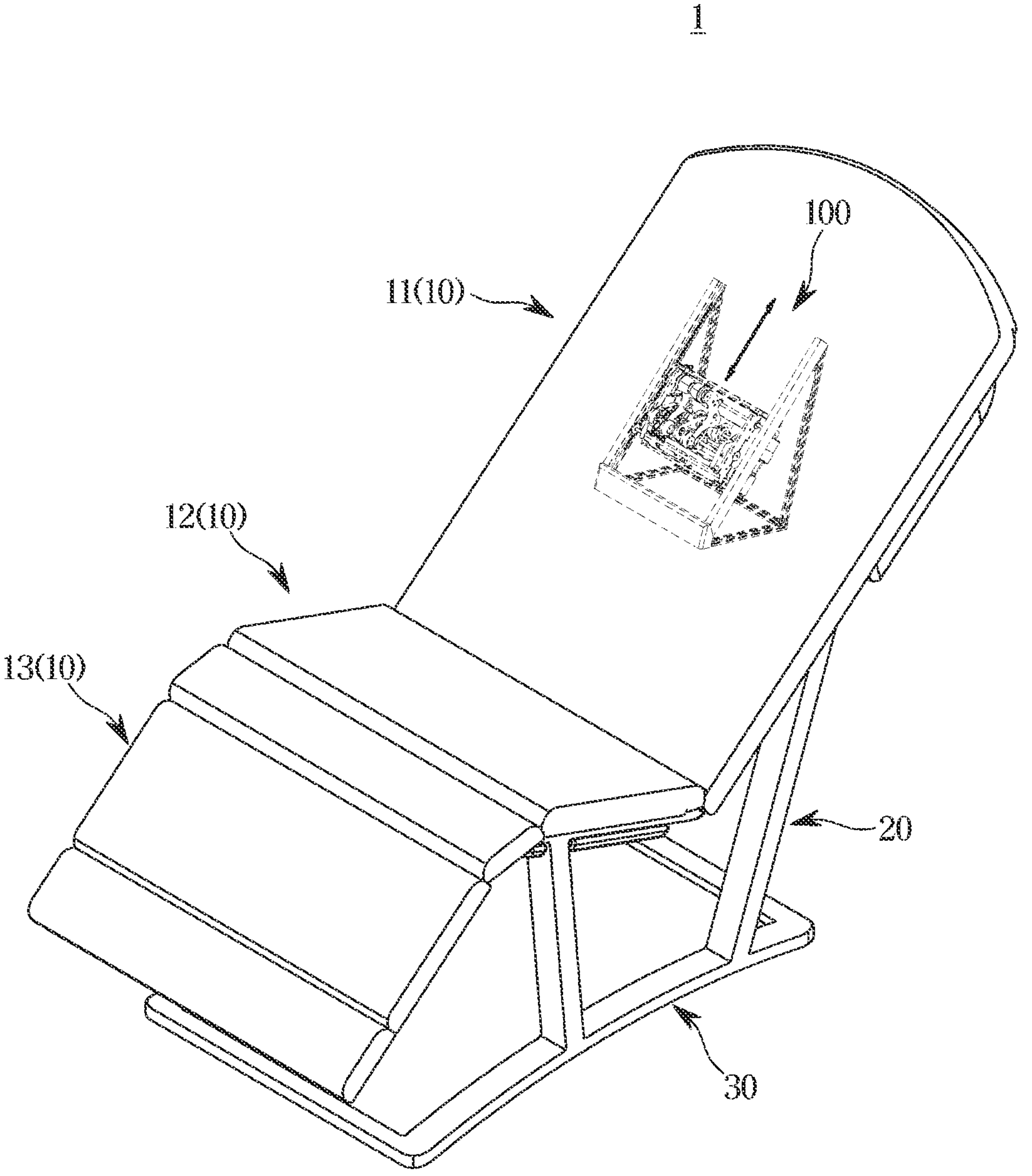
FIG. 1 is a view illustrating a massage apparatus according to an embodiment.

Embodiments described in the specification and configurations shown in the accompanying drawings are merely examples of the present disclosure, and various modifications may replace the embodiments and the drawings of the present disclosure at the time of filing of the present application.

Further, identical symbols or numbers in the drawings of the present disclosure denote components or elements configured to perform substantially identical functions.

Further, terms used herein are only for the purpose of describing particular embodiments and are not intended to limit to the present disclosure. The singular form is intended to include the plural form as well, unless the context clearly indicates otherwise. It should be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

Further, it should be understood that, although the terms "first," "second," etc., may be used herein to describe various elements, the elements are not limited by the terms, and the terms are only used to distinguish one element from another. For example, a first element could be termed a second element, and similarly, a second element could be termed a first element without departing from the scope of the present disclosure. The term "and/or" includes combinations of one or all of a plurality of associated listed items.

Meanwhile, the terms "front", "rear", "upper", "lower", "front", "rear", "top" and "bottom" used in the following description may be defined based on drawings, and the shape and position of each component may be not limited by the terms.

A massage apparatus according to an embodiment may include: a module drive motor; a module motion shaft provided to rotate by a driving force of the module drive motor, a motion guider provided to move in an extension direction of the module motion shaft as the module motion shaft rotates; a tilt drive motor; a tilt drive shaft arranged in parallel with the module motion shaft, and provided to rotate by a driving force of the tilt drive motor, a rotation axis tilting member coupled to the tilt drive shaft to rotate together with the tilt drive shaft, the rotation axis tilting member including a tilting portion having a rotation axis inclined with respect to the tilt drive shaft; and a roller bracket rotatably supporting a massage roller and connected to the motion guider and the rotation axis tilting member, wherein the massage roller is configured to move along the extension direction of the module motion shaft within a first moving range in accordance with a moving range of the motion guider, and move within a second moving range wider than the first moving range in response to rotation of the tilting portion.

The massage roller may be provided such that an area in contact with a body of a user may change as the tilt drive shaft rotates.

The massage roller may be provided in a rotational symmetrical shape around a rotation axis of the massage roller.

The massage roller may include: a first contact portion provided at a first end in a direction in which the rotation axis extends; a second contact portion provided at a second end, opposite the first end, in the direction in which the rotation axis extends; and a third contact portion provided between the first contact portion and the second contact portion The first contact portion may be provided such that an outer diameter thereof increases in a direction from the first end to the second end of the massage roller.

The second contact portion may be provided such that an outer diameter thereof decreases in the direction from the first end to the second end of the massage roller.

The third contact portion may be provided such that an outer diameter thereof is be constant in the direction from the first end to the second end of the massage roller.

The module motion shaft may include a screw thread formed on an outer circumferential surface thereof.

The motion guider may include an inner circumferential surface provided to be engaged with the screw thread.

The massage apparatus may further include a fixing bracket connecting the motion guider and the rotation axis tilting member such that the motion guider and the rotation axis tilting member move together when the motion guider moves.

The massage apparatus may further include: a rotation driver motor; a rotation drive shaft provided to rotate by a driving force of the rotation drive motor, and a side frame provided to rotate in response to the rotation of the rotation drive shaft.

The massage roller may be provided to rotate about the module motion shaft as the side frame rotates.

The massage roller may be provided to move forward as the side frame rotates in a first direction, and move rearward as the side frame rotates in a second direction opposite to the first direction.

The module motion shaft and the tilt drive shaft may be coupled to the side frame.

Hereinafter, embodiments according to the present disclosure will be described in detail with reference to the accompanying drawings.

FIG. 1 is a view illustrating a massage apparatus according to an embodiment.

A massage apparatus 1 is an apparatus that provides a user with a massage. The massage apparatus 1 may be implemented in the form of a chair in which a user may take a rest. The massage apparatus 1 may be covered by leather or cloth material to be in contact with a skin of the user. Accordingly, since the soft material comes in contact with the user's skin, the user may experience a sense of psychological comfort.

The massage apparatus 1 may include a seat frame 10 provided to support the user. The seat frame 10 may be formed to extend longitudinally from the head to the upper body, buttocks and lower body. The seat frame 10 may form a seating surface on one side. For example, the seat frame 10 may be coupled to the front of the base frame 30 such that a user's body is seated and supported thereon.

The seating surface of the seat frame 10 may be provided to be in contact with the user's body. For example, the seating surface of the seat frame 10 may be in contact with the rear surface of the user to support the user on the rear side of the user.

The seating surface of the seat frame 10 may include a soft material to enhance the seating comfort of the user. In addition, the seating surface of the seat frame 10 may include a deformable material for the rear surface of the body of the user to be pressed by a massage module 100 on the rear side of the seat frame 10. However, the material forming the seating surface is not limited thereto and may be variously provided as long as it can provide comfort to the user.

In the following description, the upper body and the lower body of the user may be distinguished based on the buttocks of the user.

The seat frame 10 is not limited to that shown in the drawings, and may be formed to individually surround the head, back, arms, legs, and buttocks of the user. The massage module 100 may be provided in the seat frame 10 to provide a massage to the user.

The massage apparatus 1 may include a leg 20 provided to support the seat frame 10. The leg 20 may be coupled to the seat frame 10 on one side and coupled to a base frame 30 supported on the floor on the other side.

The legs 20 may be disposed on the left and right sides of the seat frame 10. Legs 20 are not limited to those shown in the drawings and may be provided as one or more legs, and may be formed as a separate member on the base frame 30.

The base frame 30 may be provided in a pair of base frames 30 and disposed on the left and right sides of the seat frame 10, respectively. The base frame 30 may also be provided as a single base frame and provided as one part, unlike shown in the drawings.

The seating surface may include a first seating portion 11, a second seating portion 12, and a third seating portion 13. The first seating portion 11 may be provided to support a part of the user's head, the entirety of the user's head, and the user's upper body among the body parts of the user. The second seating portion 12 may be connected to the first seating portion 11 and may be positioned on a lower side of the first seating portion 11. The second seating portion 12 may be provided to support a rear part of the buttocks among the lower body parts of the user.

The third seating portion 13 may be connected to the second seating portion 12 and may be positioned on a lower side of the second seating portion 12. The third seating portion 13 may be provided to support a part or entirety of the user's lower body among the body parts of the user.

For example, the first seating portion 11 and the second seating portion 12 may support a part or entirety of the upper body including the user's head on the rear side of the user. The third seating portion 13 may support a part or entirety of the user's lower body on the rear side of the user.

The first seating portion 11 and the second seating portion 12 may be integrally formed with each other. However, it is not limited thereto, and the first seating portion 11 and the second seating portion 12 may be provided as separate pans. For example, the first seating portion 11 may be movably provided with respect to the second seating portion 12 such that the angle at which the first seating portion 11 supports the user's head is adjusted.

However, it is not limited thereto, and the first seating portion 11 may be connected to the second seating portion 12 to be fixed to the second seating portion 12.

The second seating portion 12 may be movably provided with respect to the third seating portion 13 such that the angle at which the second seating portion 12 supports the user's upper body is adjusted. For example, the second seating portion 12 may be provided to pivot forward and backward with respect to the third seating portion 13 based on a point at which the second seating portion 12 is connected to the third seating portion 13.

However, it is not limited thereto, and the second seating portion 12 may be connected to the third seating portion 13 to be fixed to the third seating portion 13.

The third seating portion 13 may be provided to support the user' thighs and calves on the rear side of the user. The third seating portion 13 may be divided into a portion supporting the user's thighs and a portion supporting the user's calves. The portion supporting the user's thighs in the third seating portion 13 may be formed to obliquely face up as being directed backward.

The portion supporting the calves of the user in the third seating portion 13 may be provided to pivot with respect to the portion supporting the thighs of the user such that the angle of supporting the calves of the user may be adjusted.

Although not shown in the drawings, the portion supporting the calves of the user in the third seating portion 13 may be provided in a shape surrounding the calves of the user such that the calves of the user may be accommodated therein.

The seat frame 10 and the base frame 30 shown in FIG. 1 are merely one example of the disclosure, and although not shown in the drawings, the seat frame 10 and the base frame 30 may be provided in various shapes that support the body of the user.

Although not shown in the drawing, the seat frame 10 may include an armrest for supporting the arms of the user.

Although not shown in the drawings, a housing covering the base frame 30 may be provided on the outside of the base frame 30. In addition, the housing may be provided to cover the outside of the seat frame 10. The housing may be provided to cover the upper, lower, left, and right sides of the user in a state in which the user is seated on the seat frame 10.

However, it is not limited thereto, and the housing may be provided in various shapes to form the appearance of the massage apparatus 1 while improving the overall aesthetics.

In addition, the housing may be provided to cover at least a portion of the upper, lower, left, and right sides of the user such that the user using the massage apparatus 1 feels isolated from the external environment.

In addition, a manipulator for inputting a command of the user may be formed on one surface of the housing. The user may input a command to the massage apparatus 1 through the manipulator, and the command input through the manipulator may be received by a controller of the massage apparatus 1 such that various massage modes are performed. For example, the input commands may be processed by the controller to responsively control the operations of the operate the module drive motor and the tilt drive motor. However, the input method of the manipulator is not limited thereto, and the command of the user may be received by the controller through remote control of a wireless communication method.

The seat frame 10 may include a massage module 100 capable of providing a massage to a user. The massage module 100 may be provided on the first seating portion 11 to provide a massage from the user's head to the waist. The present disclosure is not limited thereto, and a module capable of providing massage to a part or the entirety of the user's lower body may be provided in the seat frame 10 separately from the massage module 100 shown in the drawing.

Figure 2:
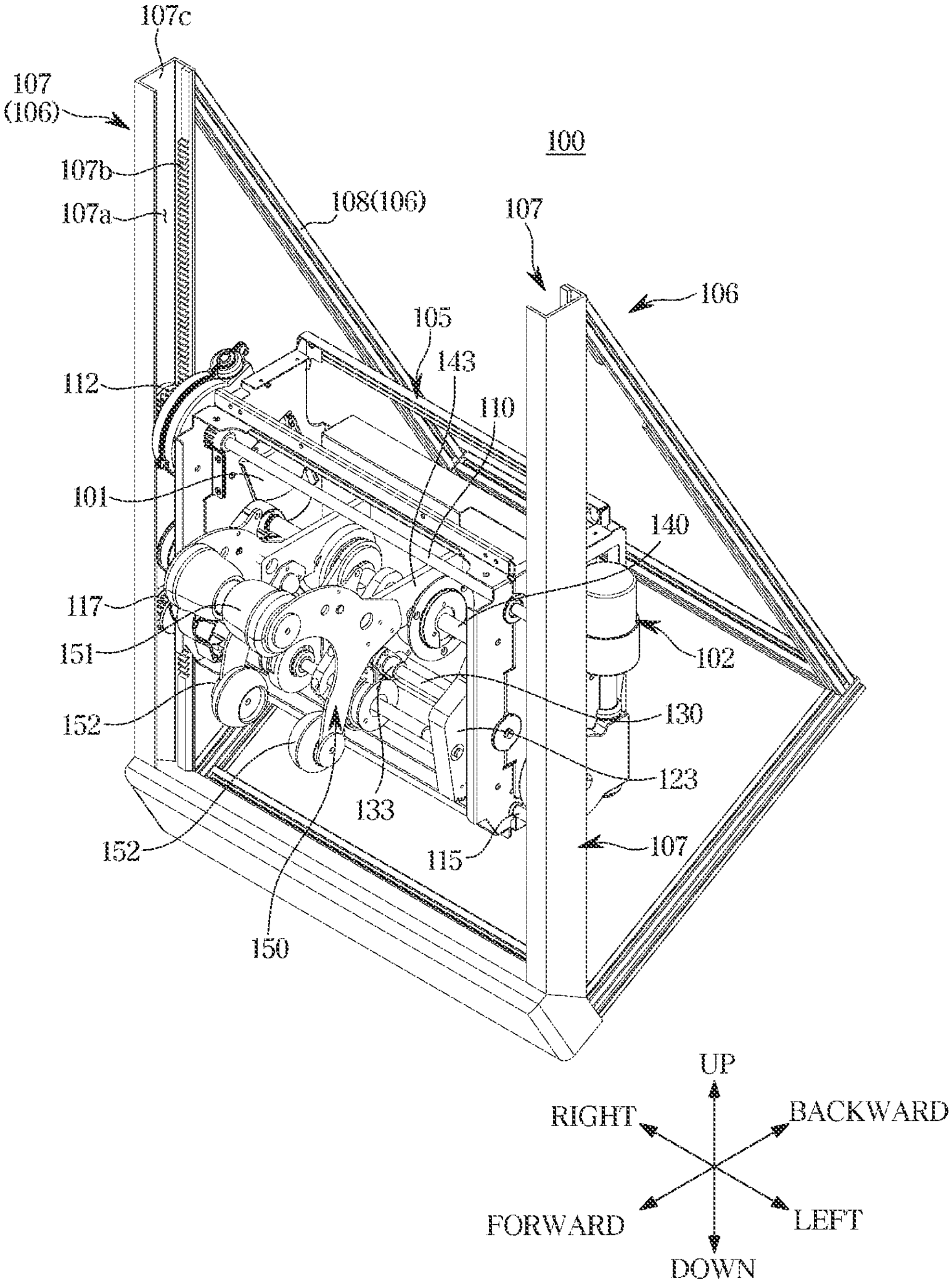
FIG. 2 is a perspective view illustrating a massage module, in a massage apparatus according to an embodiment.
Figure 3:
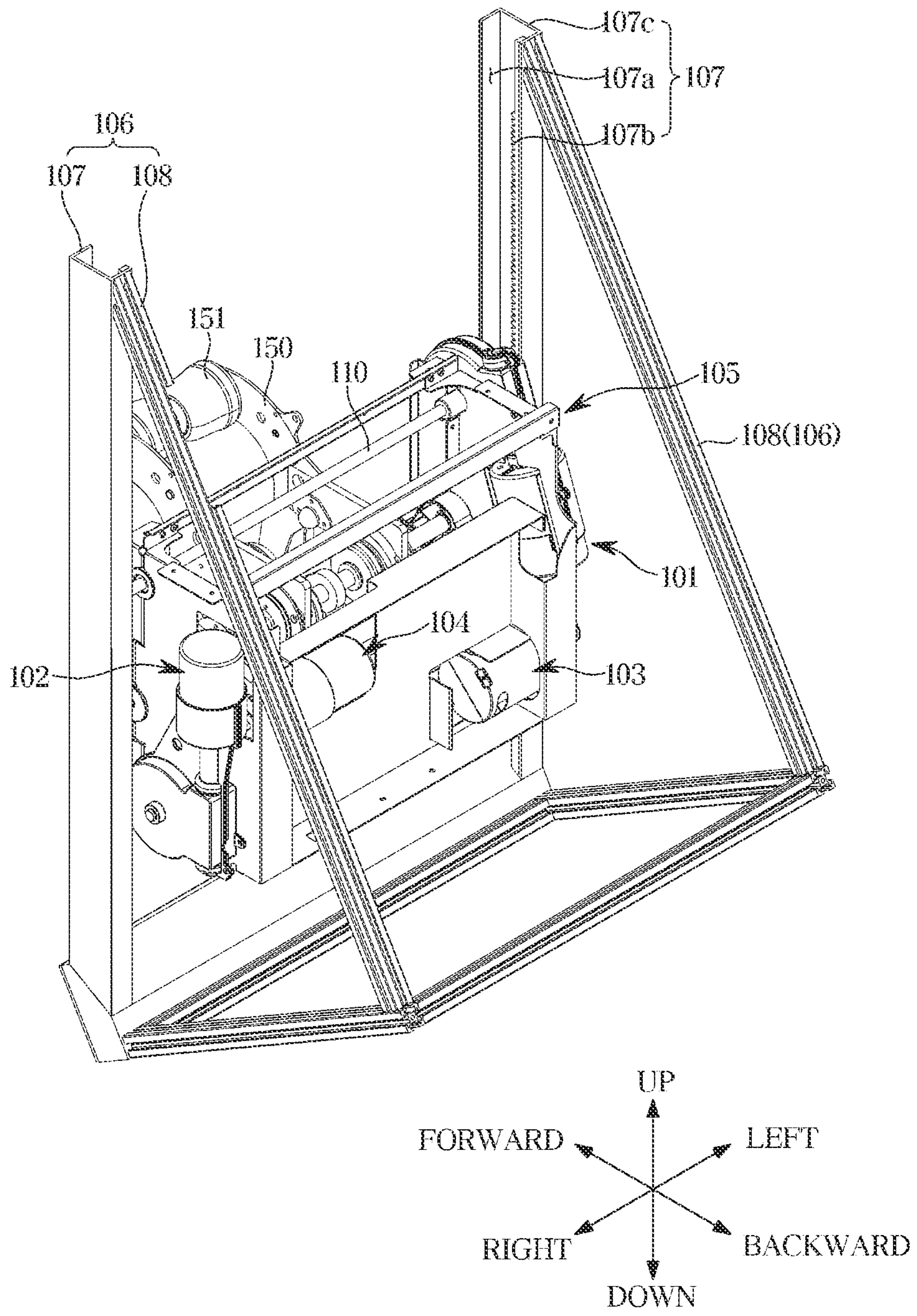
FIG. 3 is a view illustrating the massage module shown in FIG. 2, when viewed at a different angle.
Figure 4:
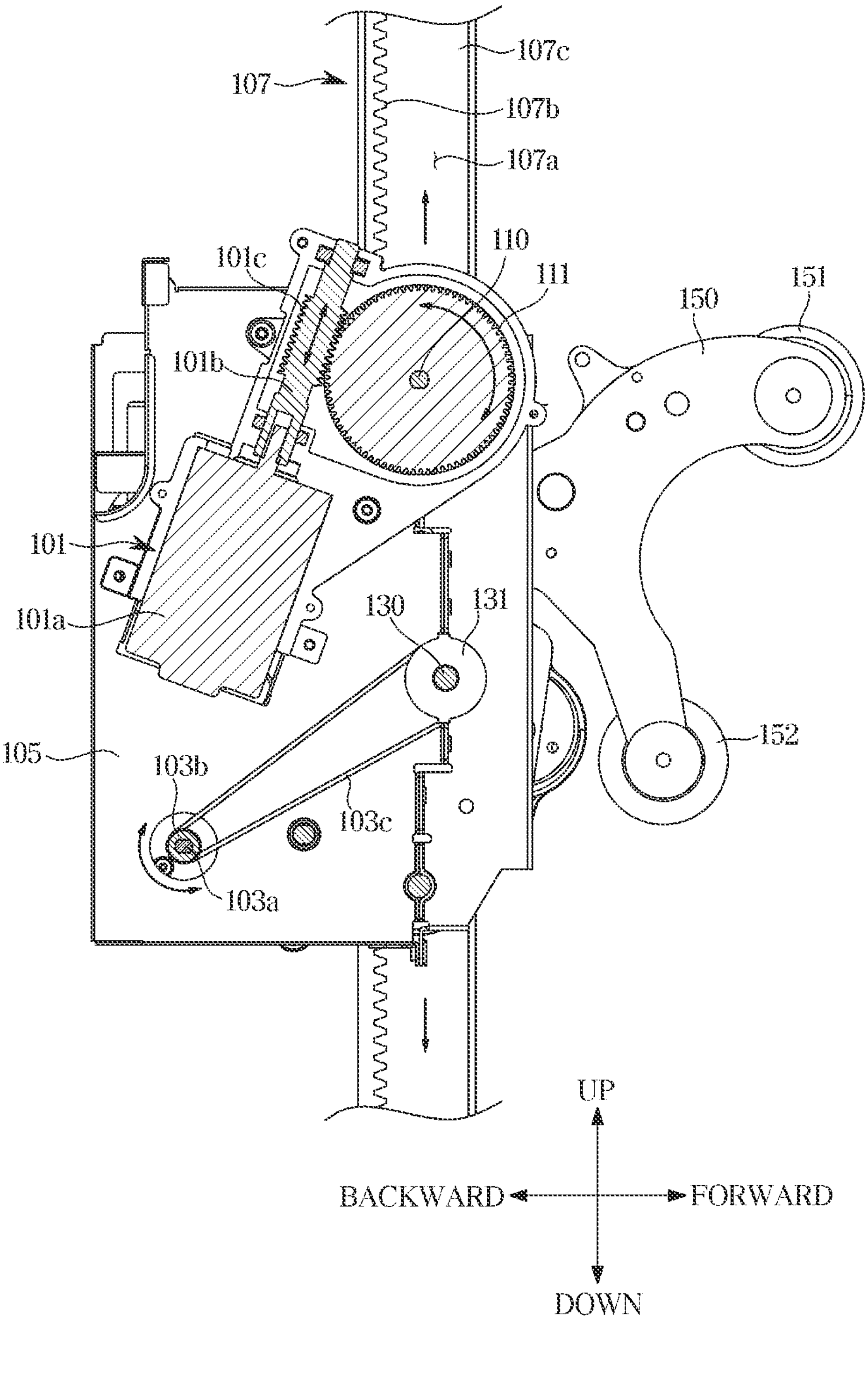
FIG. 4 is a side-sectional view for describing an operation of a guide driver, in a massage apparatus according to an embodiment.

FIG. 2 is a perspective view illustrating a massage module 100 in a massage apparatus according to an embodiment. FIG. 3 is a view illustrating the massage module shown in FIG. 2, when viewed at a different angle. FIG. 4 is a side-sectional view for describing an operation of a guide driver in a massage apparatus according to an embodiment.

Referring to FIGS. 2 and 3, the massage module 100 may include an outer frame 106 and a module base 105 disposed inside of the outer frame 106. The module base 105 may be provided with a front that is open to form an accommodation space.

The outer frame 106 may include a guide rail 107 extending in an upper to lower direction. The outer frame 106 may include a support frame 108 connected to the guide rail 107. The support frame 108 may be provided on a rear side of the guide rail 107 to support the guide rail 107.

The guide rail 107 may include a guide body **107*c* extending in the upper to lower direction. The guide rail 107 may include a guide body groove 107*a* formed as a recess in an inner surface of the guide body 107***c* and a guide rack gear 107*b* extending in the upper to lower direction along one surface of the guide body groove 107*a*. The guide rail 107 and the support frame 108 may each be provided in a pair.

The massage module 100 may include a guide driver 101. The guide driver 101 may move the module base 105 in the upper to lower direction. The guide driver 101 may be provided to rotate a first guide shaft 110.

The massage module 100 may include a massage roller 151 provided to make contact with the user's body. The massage module 100 may include a lower roller 152 provided on a lower side of the massage roller 151. The massage module 100 may include a roller bracket 150 rotatably supporting the massage roller 151 and the lower roller 152.

According to one embodiment, the massage roller 151, the lower roller 152, and the roller bracket 150 may each be provided in a pair and disposed symmetrically left and right.

The massage module 100 may include a rotation driver 102 provided to move the massage roller 151 and the lower roller 152 forward or backward.

The massage module 100 may include a module driver 103 that allows each pair of the massage rollers 151 and the lower rollers 152 to move closer to each other or away from each other in the left and right directions.

The massage module 100 may include a tilt driver 104 that changes the direction of a rotation axis of the massage roller 151 and the lower roller 152.

According to one embodiment, the guide driver 101 may be arranged on the left side of the module base 105, the rotation driver 102 may be arranged on the right side of the module base 105, the module driver 103 may be arranged on the rear left side of the module base 105, and the tilt driver 104 may be arranged on the rear right side of the module base 105. However, the arrangement of the guide driver 101, the rotation driver 102, the module driver 103, and the tilt driver 104 is not limited thereto.

Figure 5:
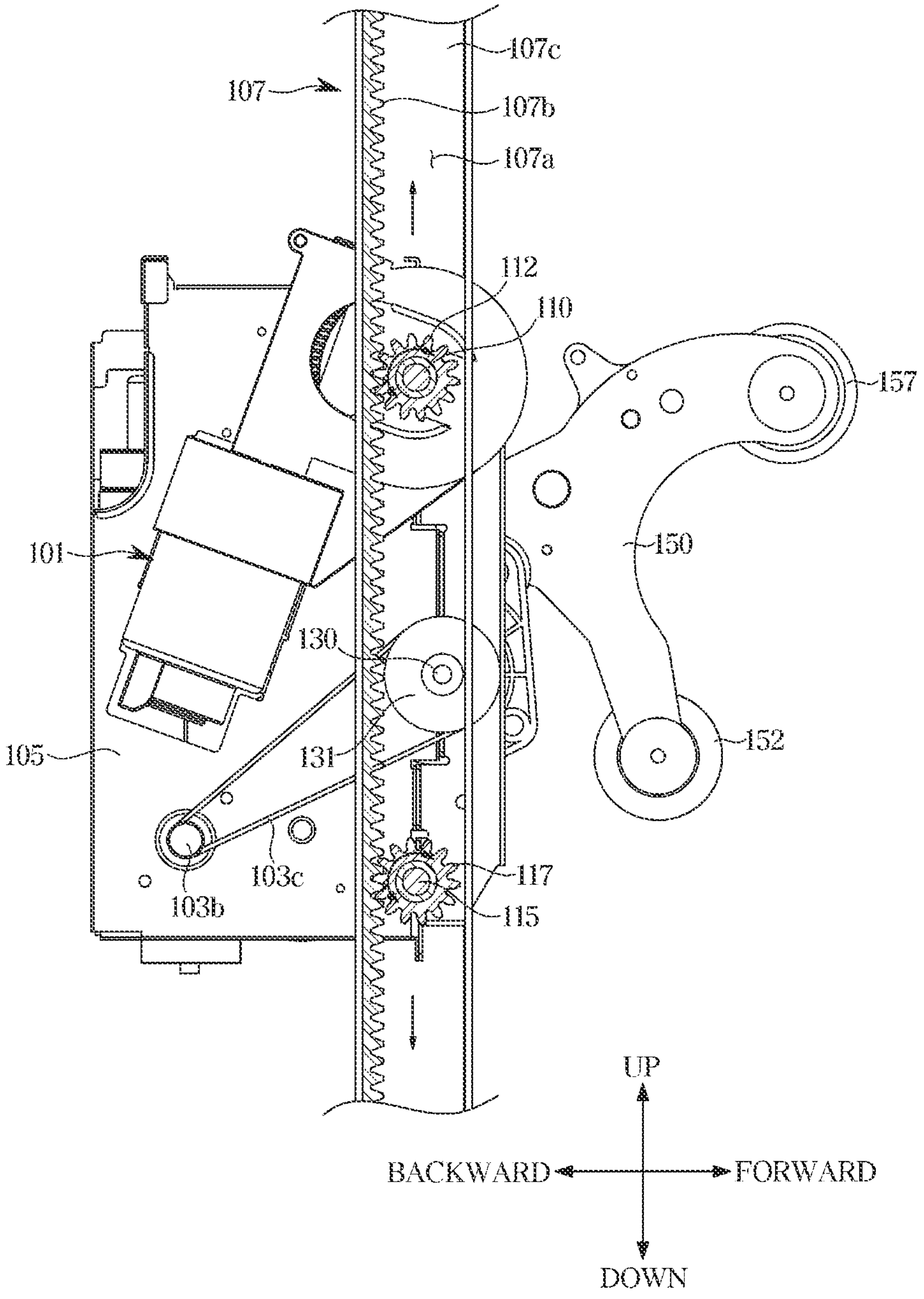
FIG. 5 is a side-sectional view for describing an operation of a guide driver, in a massage apparatus according to an embodiment.

FIG. 4 is a side-sectional view for describing an operation of a guide driver 101 in a massage apparatus according to an embodiment. FIG. 5 is a side-sectional view for describing an operation of a guide driver 101 in a massage apparatus according to an embodiment.

Hereinafter, an operation of the guide driver 101 according to an embodiment will be described with reference to FIGS. 4 and 5.

The guide driver 101 may include a guide motor 10*a*, a guide motor shaft 101*b*, and a guide shaft gear 101*c*. The guide motor 101*a* may rotate the guide motor shaft 101*b*.

A first guide shaft 110 may be coupled to a guide coupling gear 111. The guide coupling gear 111 may be formed to be engaged with the guide shaft gear 101*c*. That is, as the guide shaft gear 101*c* rotates and moves, the guide coupling gear 111 may rotate clockwise or counterclockwise.

The first guide shaft 110 may be a shaft extending in the left to right direction. First guide pinion gears 112 may be provided at both ends of the first guide shaft 110. The first guide shaft 110 may be coupled to the centers of the first guide pinion gears 112. The first guide pinion gears 112 may rotate along with the rotation of the first guide shaft 110.

The first guide pinion gear 112 may be provided to be engaged with the guide rack gear 107*b*. The first guide pinion gear 112 may be inserted into the guide body groove 107*a*. When the first guide shaft 110 is rotated by the guide driver 101, the first guide pinion gear 112 may be engaged with the guide rack gear 107*b*, and accordingly the first guide shaft 110 may be moved up and down. As the first guide shaft 110 moves up and down, the module base 105 coupled to the first guide shaft 110 may be moved up and down.

As shown in FIG. 5, the massage module 100 may include a second guide shaft 115 extending in the left and right directions on the lower side of the module base 105. The second guide shaft 115 may be coupled to the module base 105. Second guide pinion gears 117 may be provided at both ends of the second guide shaft 115. The second guide pinion gear 117 may also be engaged with the guide rack gear 107*b*, similar to the first guide pinion gear 112.

As the massage module 100 moves in the upper to lower direction along the guide rail 107, the massage module 100 may provide a massage to the entire rear surface of the user's body. The guide rail 107 and the method of driving the massage module guided in motion by the guide rail 107 may be not limited to that described above. For example, the massage module 100 may move up and down in connection with a separate pulley that transmits power from a driver, other than a rack and pinion method.

Figure 6:
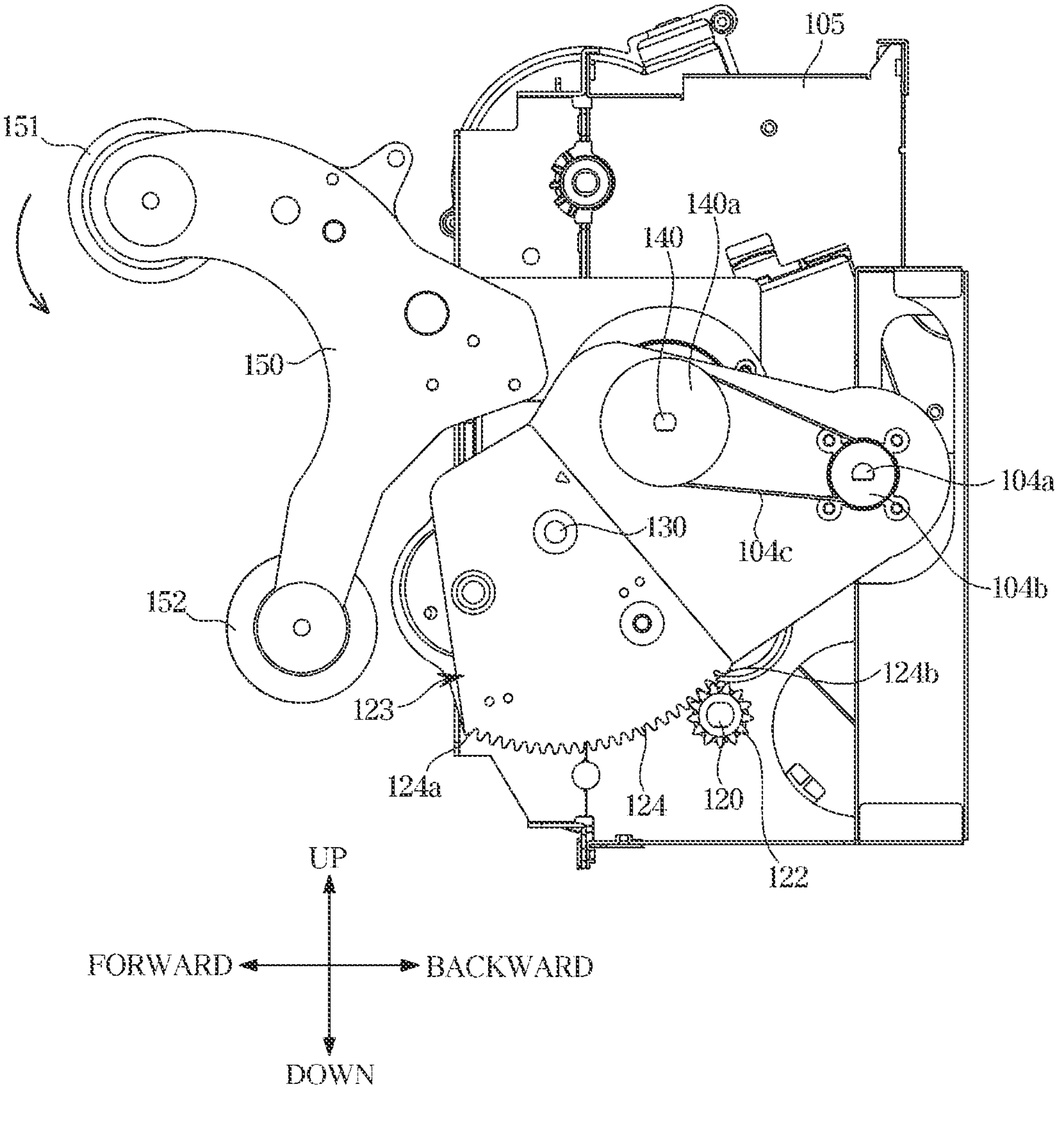
FIG. 6 is a side sectional view for describing an operation of a rotation driver in a massage apparatus according to an embodiment.
Figure 7:
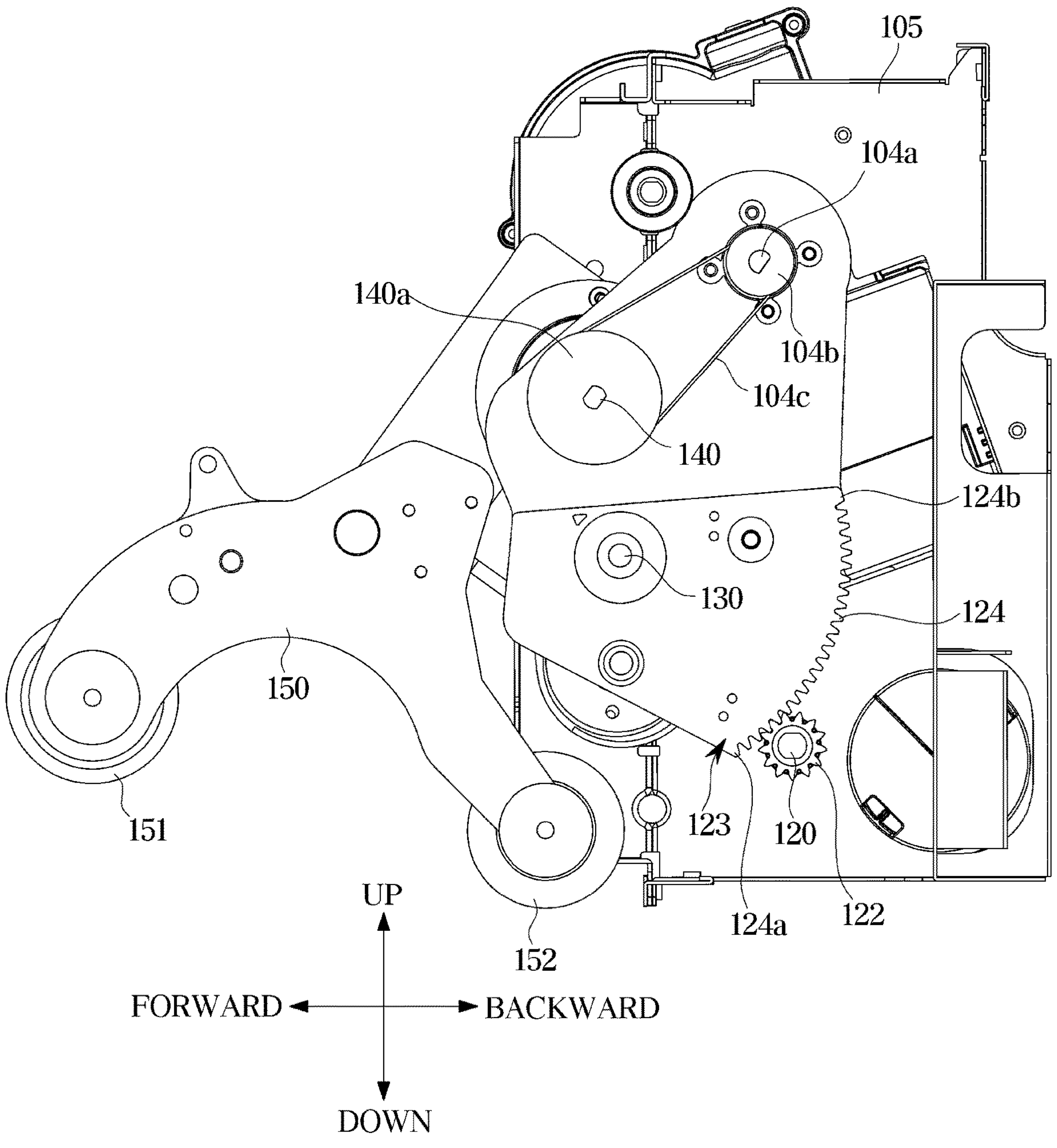
FIG. 7 is a view illustrating a side frame rotated from that shown in FIG. 6.

FIG. 6 is a side sectional view for describing an operation of a rotation driver in a massage apparatus according to an embodiment. FIG. 7 is a view illustrating a side frame rotated from that shown in FIG. 6.

The massage module 100 may include a massage roller 151 that provides a massage to the user while in contact with the user's body and a lower roller 152. The massage module 100 may include a roller bracket 150 to which the massage roller 151 and the lower roller 152 are rotatably coupled.

The massage module 100 may include the rotation driver (not shown) provided to rotate the roller bracket 150. The rotation driver may rotate a rotation drive shaft 120 to rotate a side frame 123, and as the side frame 123 rotates, the roller bracket 150 may rotate.

The rotation driver may refer to a rotation drive motor. The rotation drive shaft 120 may be provided to rotate by receiving the driving force of the rotation drive motor.

A rotation drive gear 122 may be coupled to the rotation drive shaft 120. The rotation drive gear 122 may be provided to rotate together with the rotation drive shaft 120. The rotation drive gear 122 may be provided to be engaged with a toothed portion 124 of the side frame 123.

The side frame 123 may include the toothed portion 124 provided on the outer circumferential surface thereof to be engaged with the rotation drive gear 122. The toothed portion 124 may be provided on a portion of the outer circumferential surface of the side frame 123. The toothed portion 124 may be formed to extend in an arc shape between one end 124*a* and the other end 124*b* thereof.

The rotation drive shaft 120 may rotate the side frame 123 in one direction or the other direction according to the rotation direction thereof. The side frame 123 may rotate in a range between the one end 124*a* and the other end 124*b* of the toothed portion 124. The side frame 123 may rotate around a module motion shaft 130. Therefore, even when the side frame 123 rotates, the position of the module motion shaft 130 may not change.

As the side frame 123 rotates, the massage roller 151 and the lower roller 152 may move forward or backward. That is, the rotation driver 102 may rotate the massage roller 151 and the lower roller 152 within a predetermined angular range. Rotational motion of the massage roller 151 and the lower roller 152 within the predetermined angular range may generate a motion of rubbing the user's upper body, such as the user's shoulder or back.

As the side frame 123 rotates, the massage roller 151 and the lower roller 152 may move upward or move downward.

In response to the rotation of the side frame 123, the massage roller 151 and the lower roller 152 may move simultaneously in the front to rear direction and the upper to lower direction.

Figure 8:
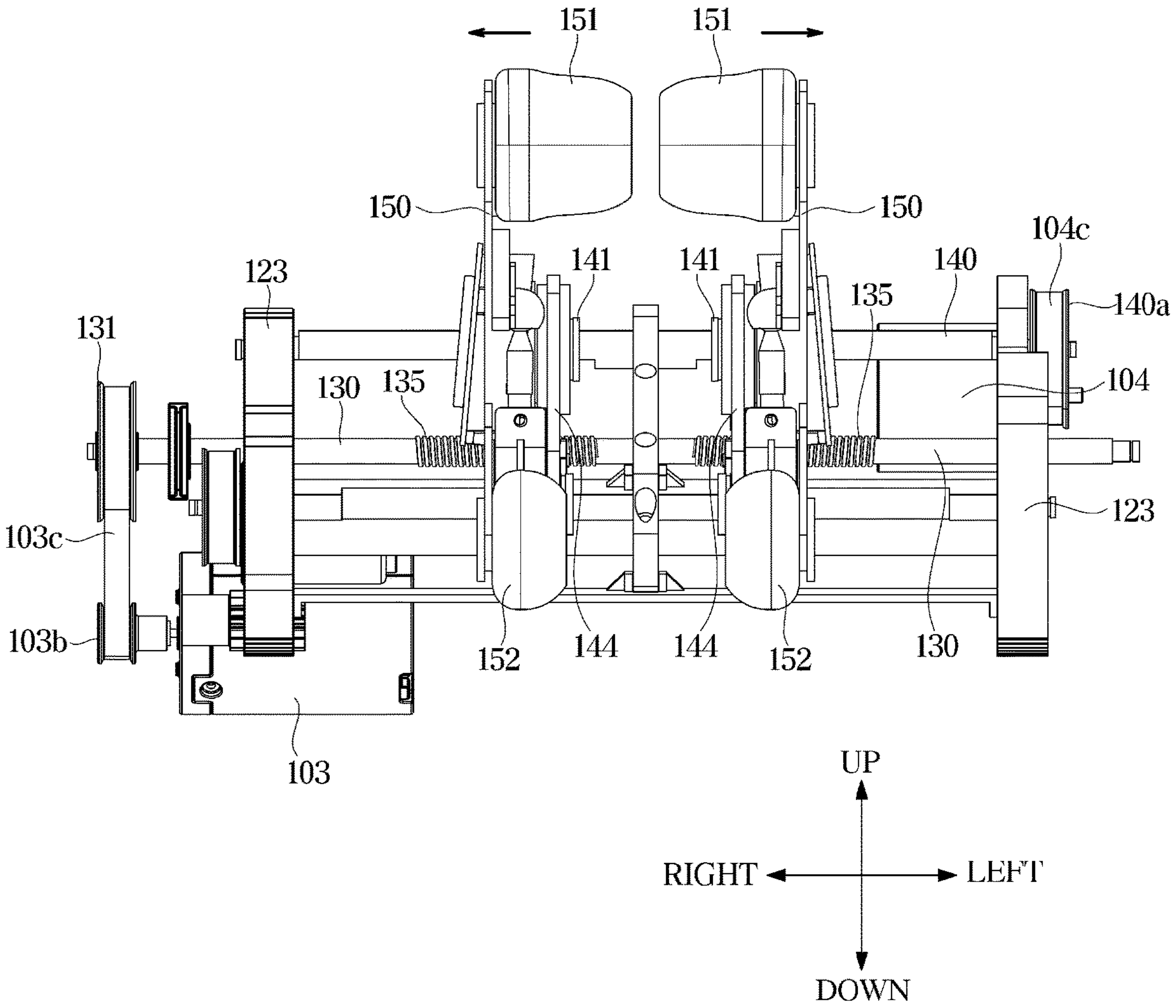
FIG. 8 is a front view illustrating some components of a massage module, in a massage apparatus according to an embodiment.
Figure 9:
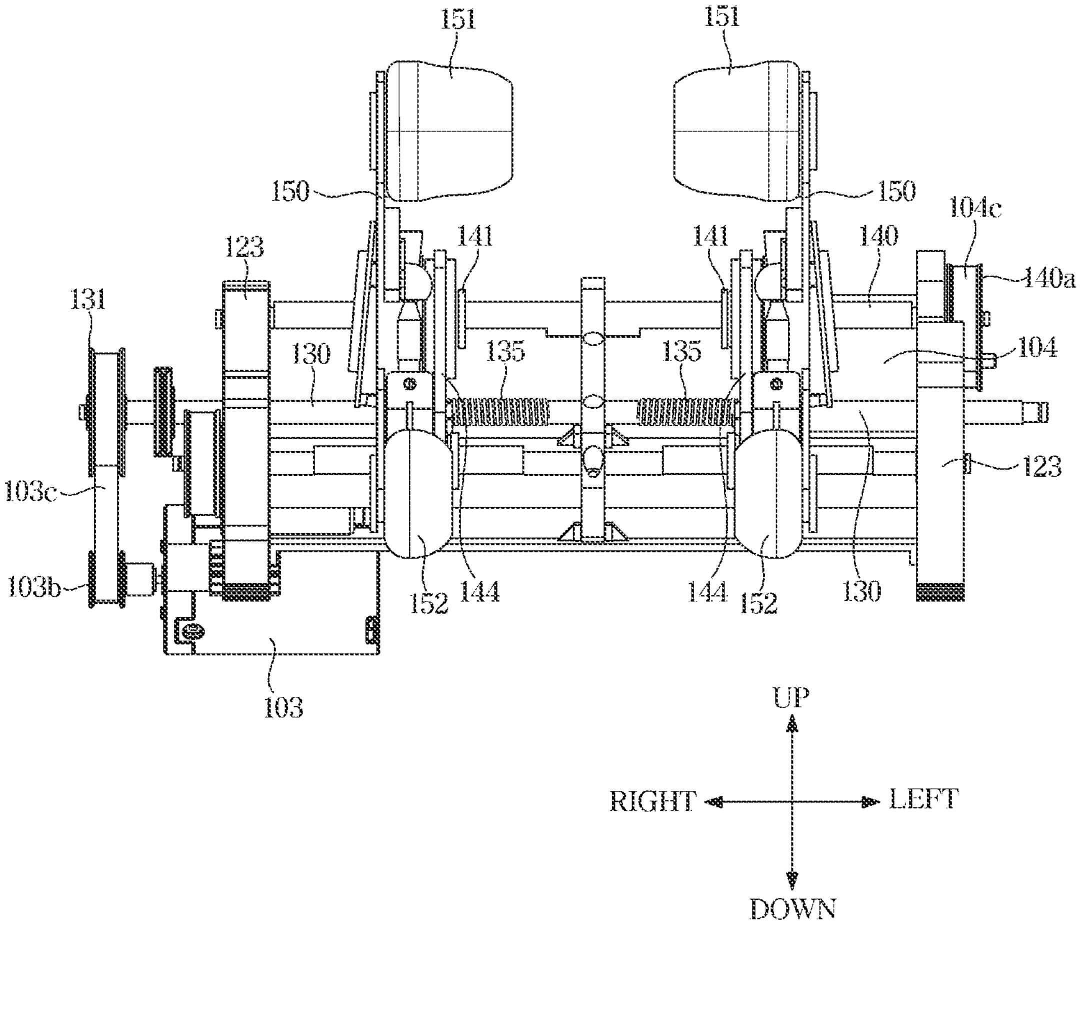
FIG. 9 is a view illustrating a motion guider and a roller bracket moved laterally from those shown in FIG. 8.

FIG. 8 is a front view illustrating some components of a massage module in a massage apparatus according to an embodiment. FIG. 9 is a view illustrating a motion guider and a roller bracket moved laterally from those shown in FIG. 8.

Referring to FIGS. 8 and 9, as a module motor shaft (103) connected to the module driver 103 rotates, a module motion pulley 103*c* may rotate. The module motion pulley 103*c* may circulate around a motion pulley member 103*b* and a motion coupling member 131.

As the motion coupling member 131 rotates, the module motion shaft 130 may be rotated. The module motion shaft 130 may be coupled to the center of the motion coupling member 131. The module motion shaft 130 may be provided in a substantially cylindrical shape.

The module motion shaft 130 may include a screw thread 135 formed on the outer circumferential surface thereof. As the module motion shaft 130 rotates, a motion guider (133 in FIG. 2) may be moved in the left to right directions. The motion guider 133 may include an inner circumferential surface provided to be engaged with the screw thread 135. According to one embodiment, the motion guider 133 may include a plurality of balls therein. With such a configuration, the frictional force between a screw thread inside the motion guider 133 and the screw thread 135 on the outer circumferential surface of the module motion shaft 130 may be reduced.

According to the structure described above, when the module motion shaft 130 is rotated by the driving force of the module driver 103, the motion guider 133 may be moved in the horizontal direction. As the motion guider 133 moves in the horizontal direction, the massage roller 151, the lower roller 152, and the roller bracket 150 may be moved in the horizontal direction together.

Each pair of massage rollers 151 and lower rollers 152 may be moved away from each other or close to each other in the horizontal direction, thereby providing a massage suitable for a user's body size.

Figure 10:
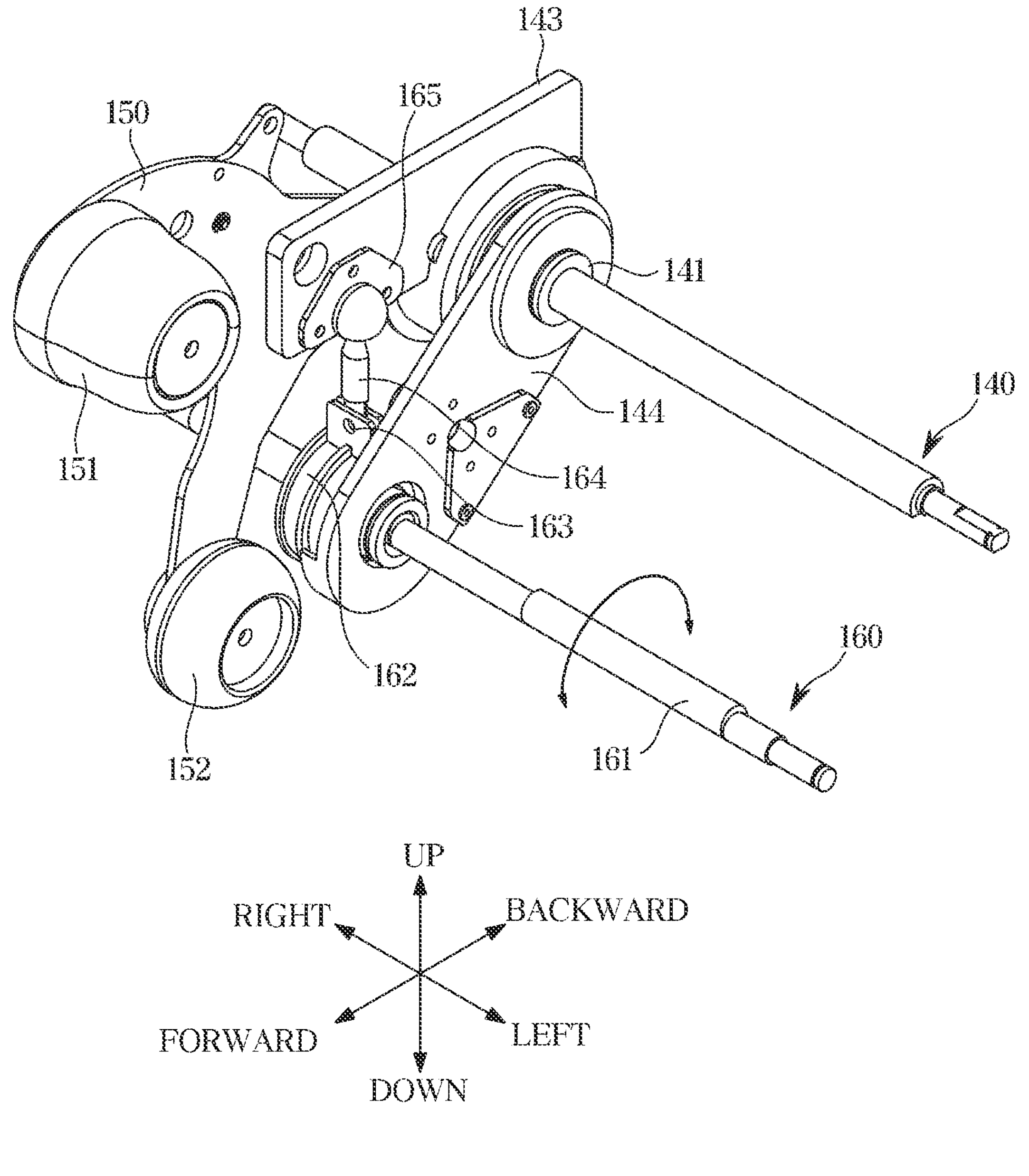
FIG. 10 is a perspective view illustrating some components of a massage module, in a massage apparatus according to an embodiment.

FIG. 10 is a perspective view illustrating some components of a massage module in a massage apparatus according to an embodiment.

Referring to FIG. 10, the massage module may include a tilt drive shaft 140 provided to rotate by a tilt driver (not shown), which will be described below, and an eccentric shaft 160 provided in parallel with the tilt drive shaft 140.

The tilt drive shaft 140, the module motion shaft (not shown), and the eccentric shaft 160 may be connected to each other by a fixing bracket 144. The tilt drive shaft 140, the module motion shaft (not shown), and the eccentric shaft 160 may be coupled to the fixing bracket 144.

As the tilt drive shaft 140 rotates, the rotation axis of the massage roller 151 may be subject to change. This will be described below.

As the eccentric shaft 160 rotates, the massage roller 151 may be moved such that the rotation axis thereof forms a circular moving path. The eccentric shaft 160 may include an eccentric portion that protrudes from a shaft portion 161 and has a rotation center spaced apart from a rotation center of the shaft portion 161.

The eccentric shaft 160 may be provided at one side thereof with an eccentric shaft bearing 162 to support the eccentric shaft 160 when the eccentric shaft 160 rotates. The eccentric shaft bearing 162 may include a first connection portion 163. The first connection portion 163 may be connected to one side of a connection member 164.

The tilt drive shaft 140 may be coupled at one side thereof with a rotation axis tilting member 141. A connection bracket 143 may be provided on an outside of the rotation axis tilting member 141. The connection bracket 143 may connect the rotation axis tilting member 141, the roller bracket 150, and the eccentric shaft bearing 162. Specifically, the roller bracket 150, the rotation axis tilting member 141, and a second connection portion 165 may be coupled to the connection bracket 143, and through the connection bracket 143 coupled with the second connection portion 165, the eccentric shaft bearing 162 may be connected to the connection bracket 143.

Figure 11:
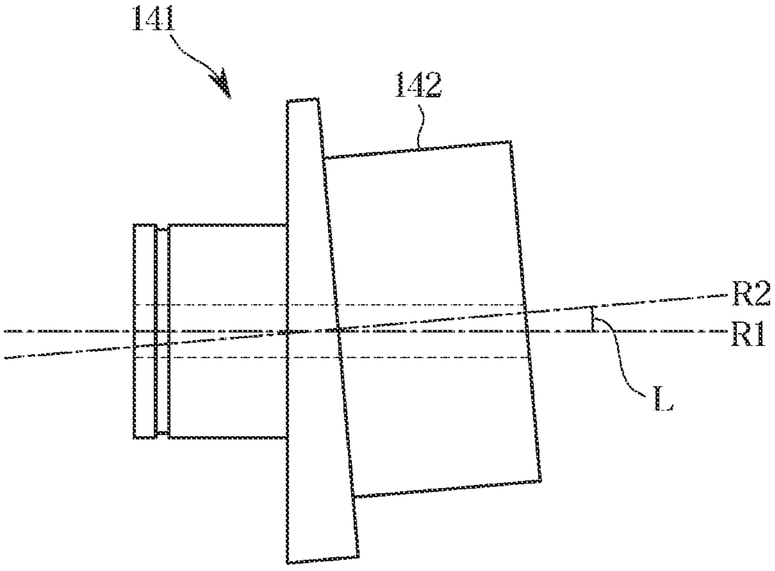
FIG. 11 is a view separately illustrating a rotation axis tilting member, in a massage apparatus according to an embodiment.

FIG. 11 is a view illustrating a rotation axis tilting member in a massage apparatus according to an embodiment.

The rotation axis tilting member 141 will be described with reference to FIG. 11.

The rotation axis tilting member 141 may include a tilting portion 142 having a rotation axis R2 inclined with respect to a rotation axis R1 of the tilt drive shaft 140.

The tilt drive shaft 140 may be coupled to the rotation axis tilting member 141. The tilt drive shaft 140 may be coupled to the rotation axis tilting member 141 so as to pass through the rotation axis tilting member 141.

The rotation axis tilting member 141 may include the tilting portion 142 in a cylindrical shape. The rotation axis R2 of the tilting portion 142 and the rotation axis R1 of the tilt drive shaft 140 may be inclined at a predetermined angle with respect to each other. With such a structure, when the rotation axis tilting member 141 rotates together with the tilt drive shaft 140, the rotation axis of the connection bracket 143 coupled to the tilting portion 142 may be moved. In addition, as the rotation axis of the connection bracket 143 moves, the roller bracket 150 connected to the connection bracket 143 may be move, by which the rotation axes of the massage roller 151 and the lower roller 152 may be moved. Accordingly, as the tilt drive shaft 140 rotates, the direction in which the rotation axis of the massage roller 151 is oriented may continuously change.

Figure 12:
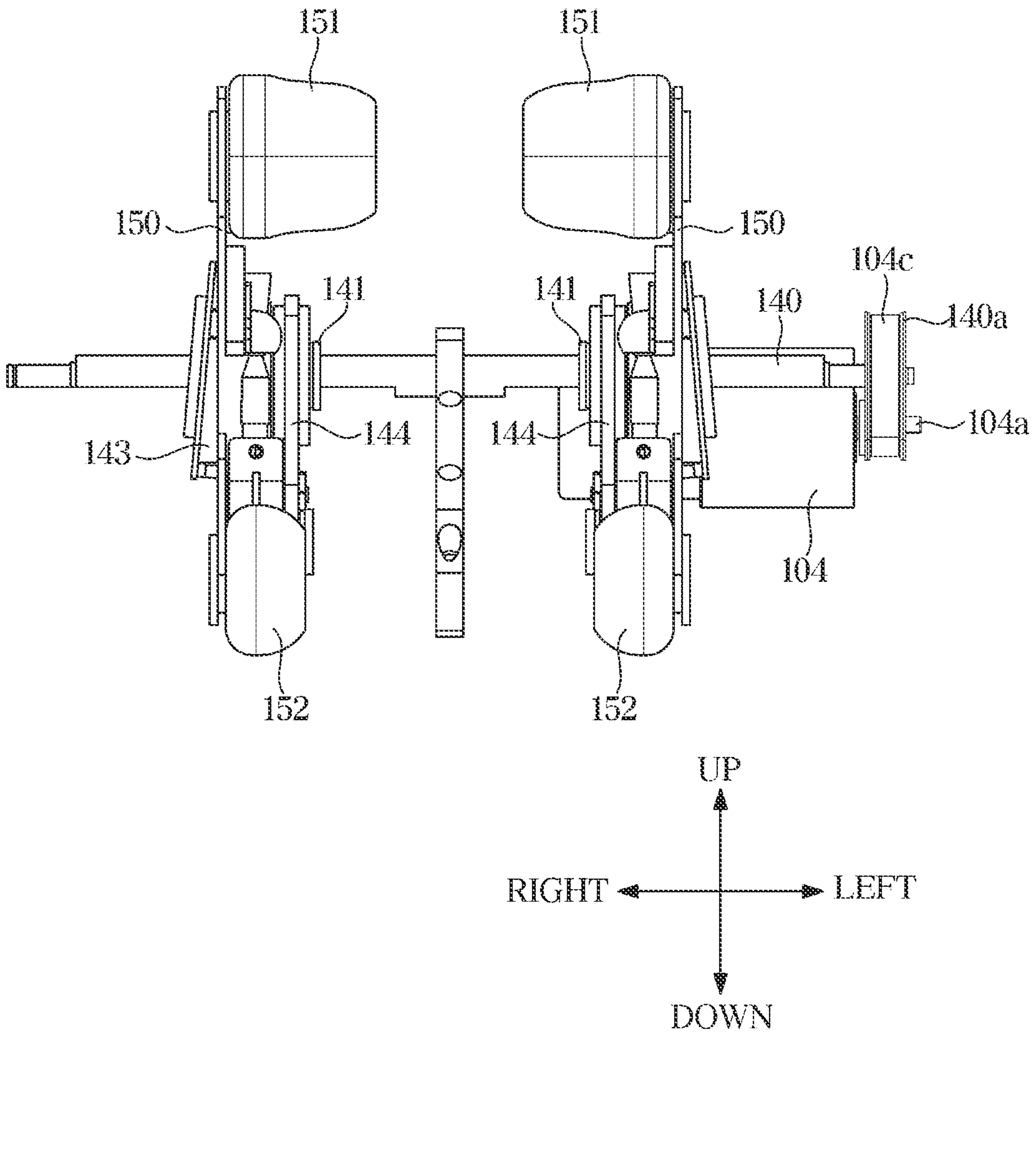
FIG. 12 is a front view illustrating some components of a massage module, in a massage apparatus according to an embodiment.
Figure 13:
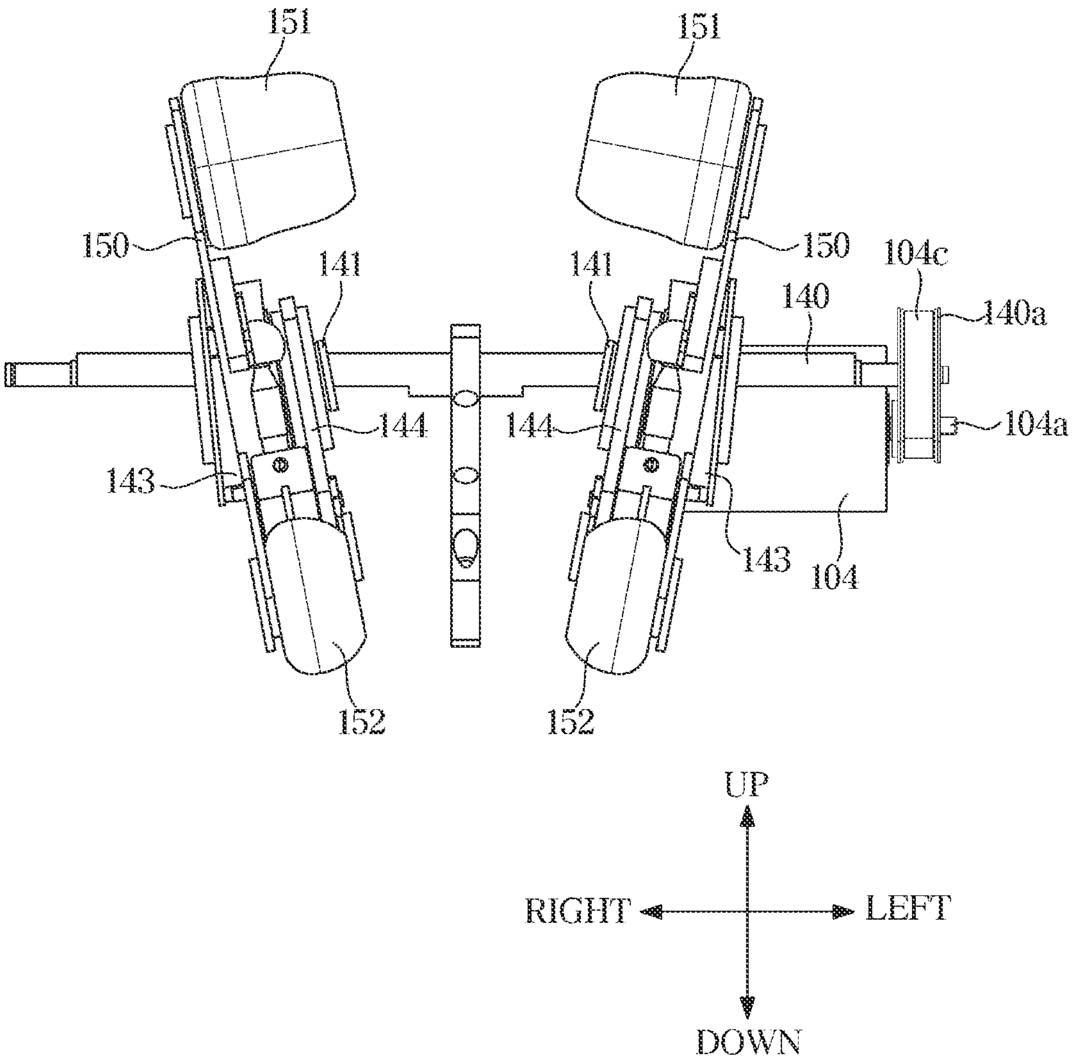
FIG. 13 is a view illustrating a tilt drive shaft rotated from that shown in FIG. 12.
Figure 14:
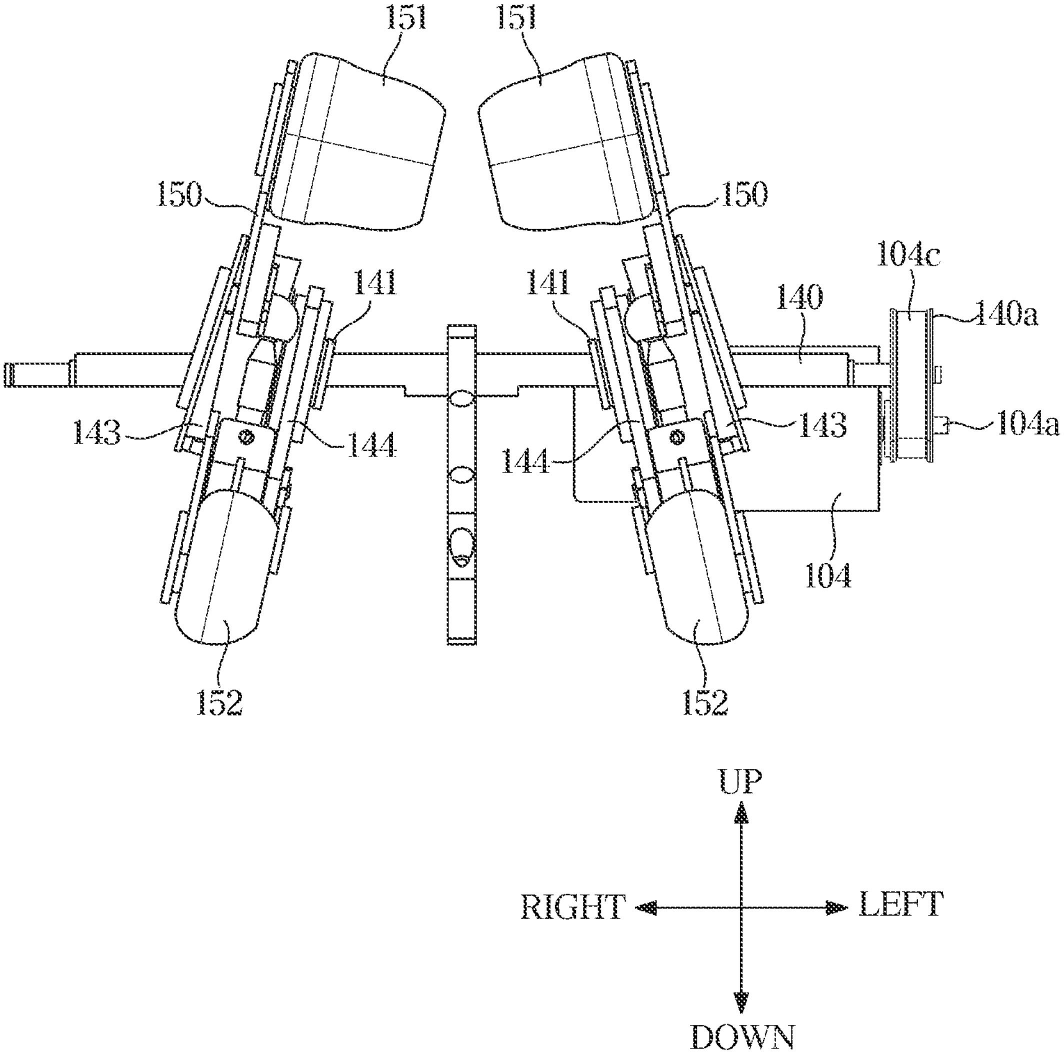
FIG. 14 is a view illustrating a tilt drive shaft rotated from that shown in FIG. 13.

FIG. 12 is a front view illustrating some components of a massage module in a massage apparatus according to an embodiment. FIG. 13 is a view illustrating a tilt drive shaft rotated from that shown in FIG. 12. FIG. 14 is a view illustrating a tilt drive shaft rotated from that shown in FIG. 13.

The operation of the tilt driver 104 will be described with reference to FIGS. 11 to 13.

The tilt driver 104 may include a tilt motor shaft 104*a* rotated by a tilt motor and a tilt pulley member (104*b* in FIG. 6) connected to the tilt motor shaft 104*a*. The tilt pulley member 104*b* may allow a tilt pulley 104*c* to operate in a circulation manner.

One side of the tilt pulley 104*c* may be supported by the tilt pulley member 104*b*, and the other side of the tilt pulley 104*c* may be supported by a tilt coupling gear. The tilt coupling gear 140*a* may rotate the tilt drive shaft 140. The tilt drive shaft 140 may be arranged at the center of the tilt coupling gear 140*a*.

When the tilt drive shaft 140 rotates, the rotation axis tilting member 141 may rotate together with the tilt drive shaft 140. In addition, the connection bracket 143 coupled to the rotation axis tilting member 141 may rotate together with the rotation axis tilting member 141. As the connection bracket 143 rotates, the massage roller 151 may be moved to be directed toward the inside or outside of the massage module 100.

Referring to FIG. 12, when the tilt drive shaft 140 is located at a predetermined first position, the rotation axis of the massage roller 151 may be extended in a horizontal direction. In other words, the roller bracket 150 may be disposed in a vertical direction.

Referring to FIG. 13, when the tilt drive shaft 140 is rotated at a predetermined angle in one direction from the first position and located at a second position, the massage roller 151 may be disposed to be oriented toward the outside of the massage module 100. When the tit drive shaft 140 is rotated at a predetermined angle in one direction to be located from the first position to the second position, the roller brackets 150 may be moved such that the pair of massage rollers 151 move away from each other, and the pair of lower rollers 152 move closer to each other. In this case, the pair of massage rollers 151 may extend the massage range up to the outside of the user's shoulders.

Referring to FIG. 14, when the tilt drive shaft 140 rotates at a predetermined angle in one direction from the second position and thus located at a third position, the massage roller 151 may be disposed to be directed toward the inside of the massage module 100. When the tilt drive shaft 140 is rotated at a predetermined angle in one direction to be located from the second position to the third position, the roller bracket 150 may be moved such that the pair of massage rollers 151 move closer to each other, and the pair of lower rollers 152 move away from each other. In this case, the pair of massage rollers 151 may provide massage to the center of the user's back.

As described above, by rotation of the tilt drive shaft 140, the massage module 100 may expand the range of massage area. Specifically, the rotation of the module motion shaft 130 may allow the massage roller 151 to provide a massage to the user within a first moving range in the horizontal direction. In addition, separately from the rotation of the module motion shaft 130, the rotation of the tilt drive shaft 140 may allow the massage roller 151 to provide a massage to the user within a second moving range wider than the first moving range.

That is, even after the distance between the pair of massage rollers 151 is maximized by the module motion shaft 130, the distance between the pair of massage rollers 151 may be additionally adjusted by the tilt drive shaft 140. With such a configuration, the user may be provided with a wider range of massage.

Figure 15:
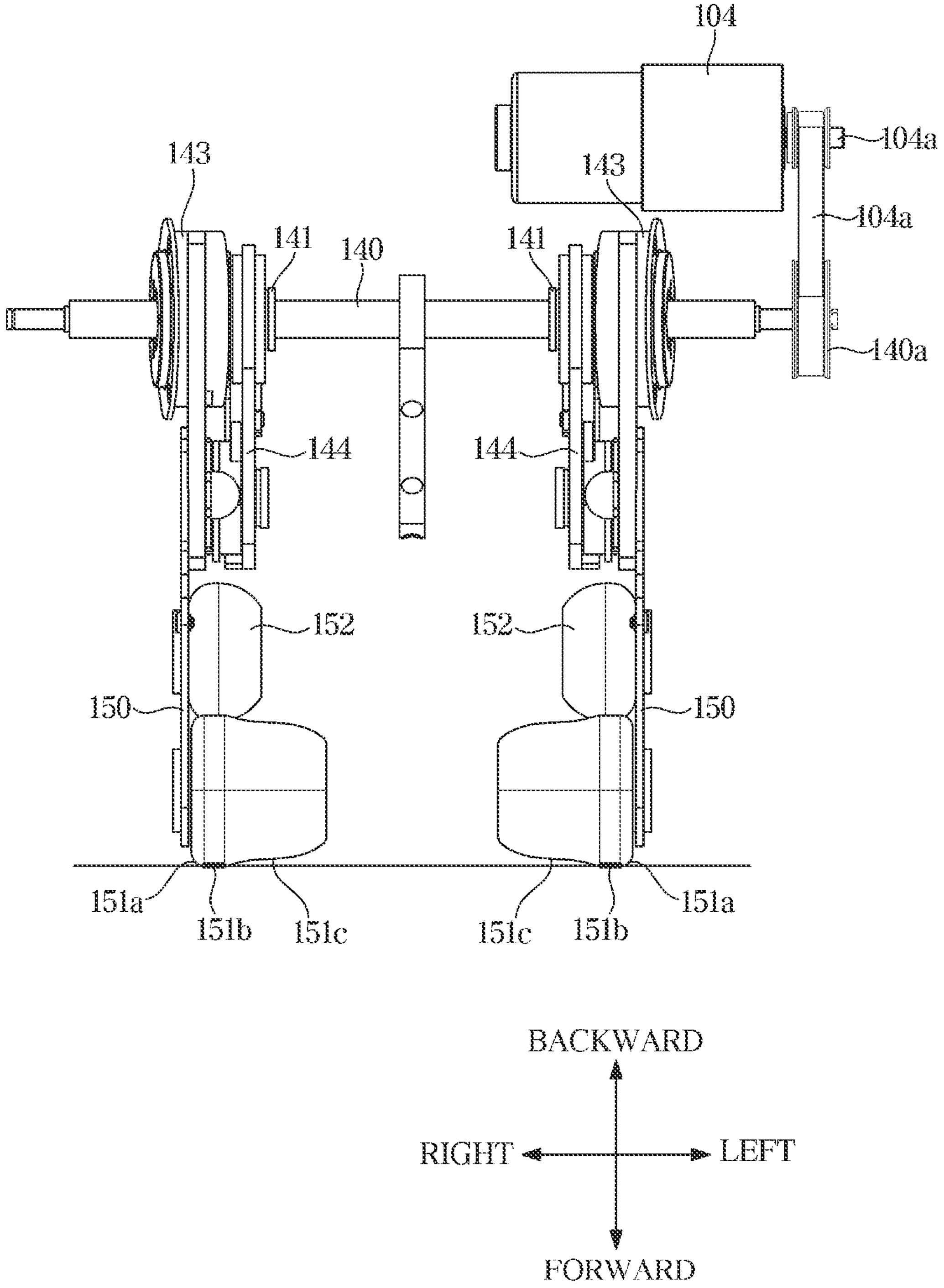
FIG. 15 is a plan view illustrating some components of a massage module, in a massage apparatus according to an embodiment.
Figure 16:
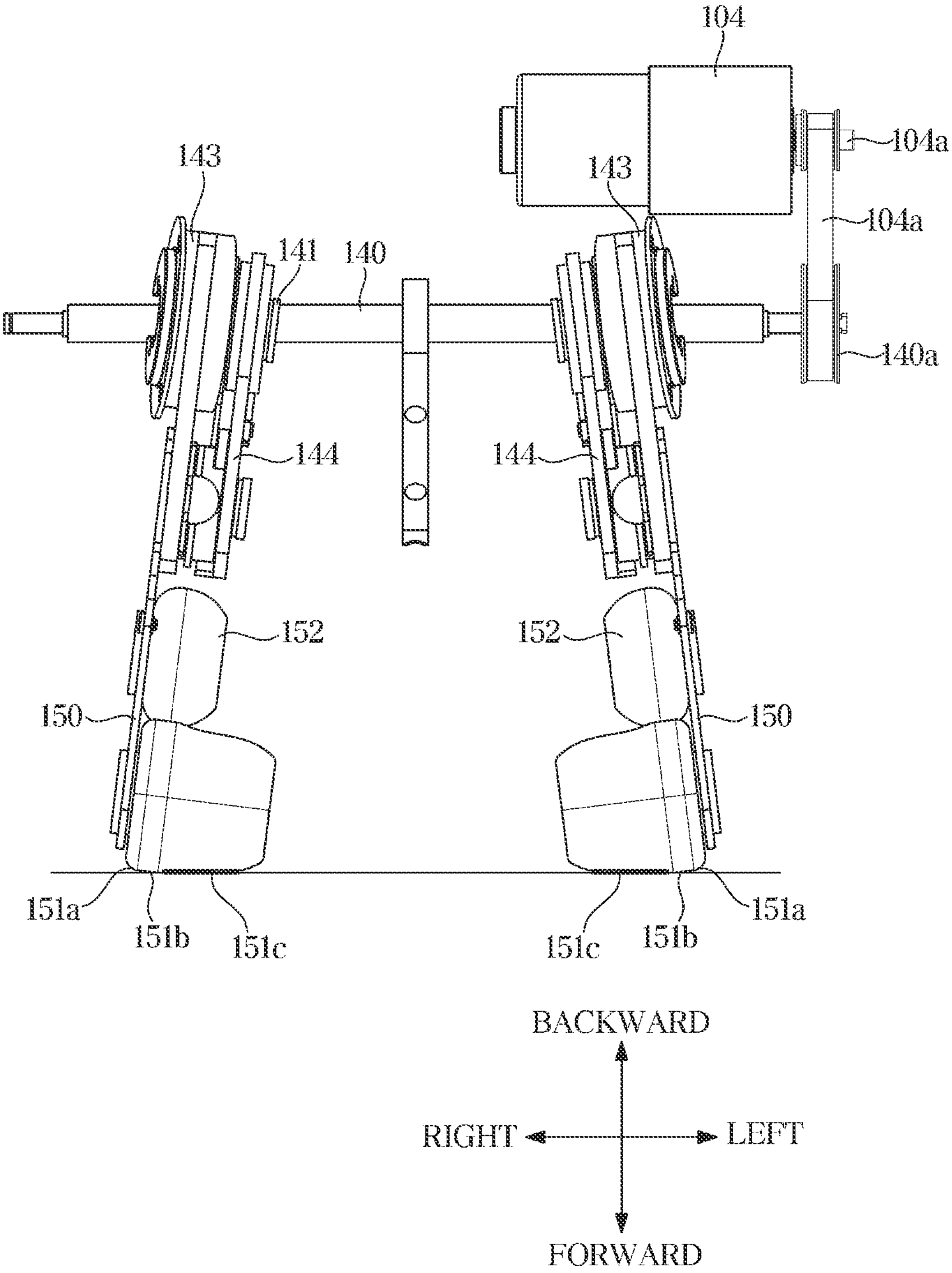
FIG. 16 is a view illustrating a tilt drive shaft rotated from that shown in FIG. 15
Figure 17:
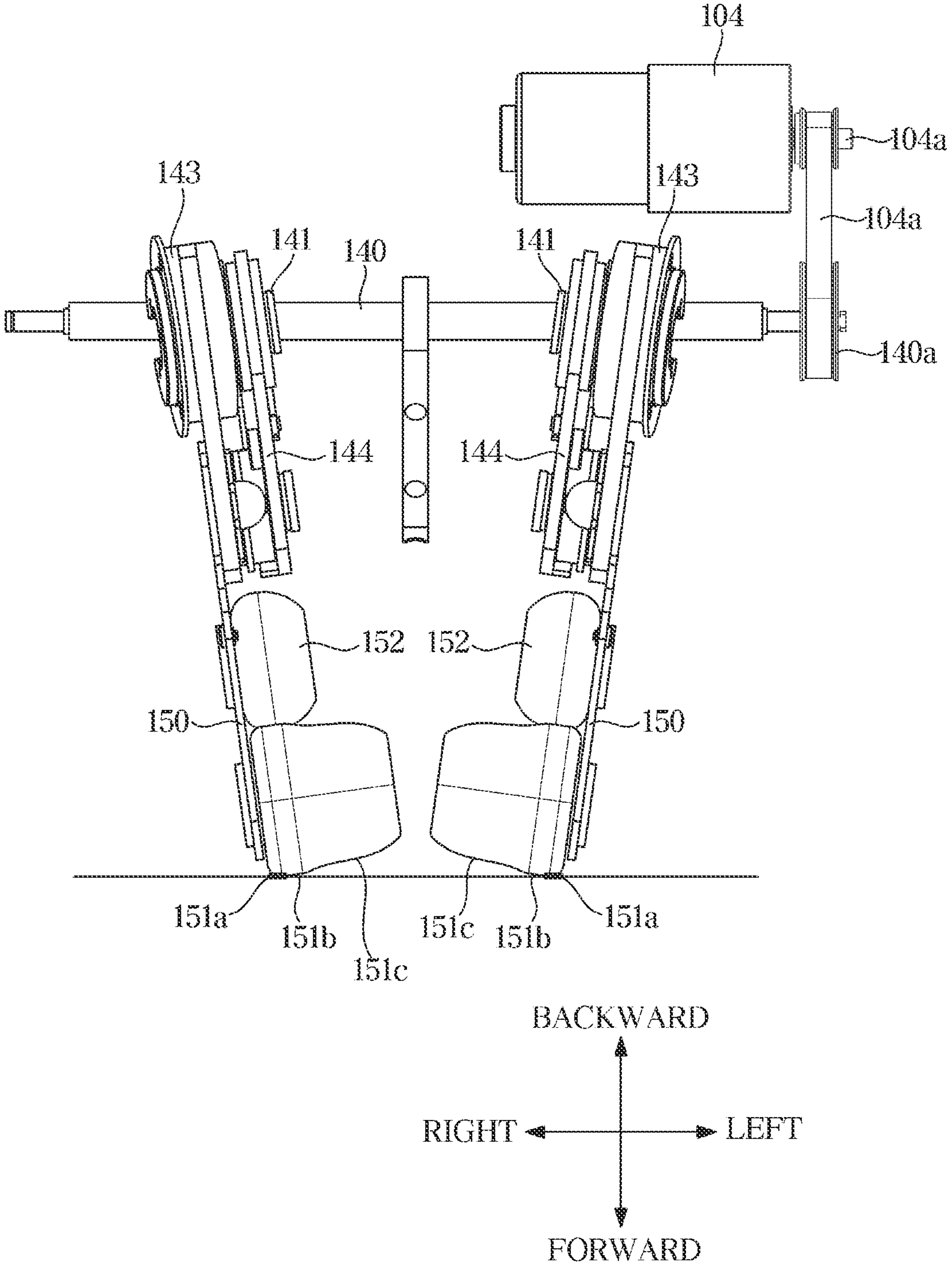
FIG. 17 is a view illustrating a tilt drive shaft rotated from that shown in FIG. 16.

FIG. 15 is a plan view illustrating some components of a massage module in a massage apparatus according to an embodiment. FIG. 16 is a view showing a tilt drive shaft rotated from that shown in FIG. 15. FIG. 17 is a view showing a tilt drive shaft rotated from that shown in FIG. 16.

Hereinafter, a specific shape of the massage roller 151 will be described with reference to FIGS. 15 to 17.

The massage roller 151 may change in a contact area with a user's body according to the arrangement thereof. The massage roller 151 may have a shape of which the area in contact with the user's body changes as the tilt drive shaft 140 rotates.

Specifically, the massage roller 151 may have a rotationally symmetric shape around the rotation axis of the massage roller 151, and may include a first contact portion 151*a*, a second contact portion 151*c*, and a third contact portion 151*b* sequentially disposed from one end to the other end in a direction in which the rotation axis extends.

The first contact portion 151*a* may be provided such that the outer diameter thereof increases in a direction from the one end to the other end of the massage roller 151. The second contact portion 151*c* may be provided such that the outer diameter thereof decreases in the direction from the one end to the other end of the massage roller 151. The third contact portion 151*b* may be provided such that the outer diameter thereof is constant in the direction from the one end to the other end of the massage roller 151.

With the structure of the massage roller 151 described above, the massage roller 151 may provide various contact areas to the user, and the user may select a contact area according to his/her preference.

Referring to FIG. 15, when the tilt drive shaft 140 is located at the first position, the massage roller 151 may be disposed such that the third contact portion 151*b* of the massage roller 151 comes in contact with the user's body. The third contact portion 151*b* may come in contact with the user's body by as much as a first contact area.

Referring to FIG. 16, when the tilt drive shaft 140 is located at the second position, the massage roller 151 may be disposed such that the second contact portion 151*c* of the massage roller 151 comes in contact with the user's body. The second contact portion 151*c* may come in contact with the user's body by as much as a second contact area larger than the first contact area.

Referring to FIG. 17, when the tilt drive shaft 140 is located at the third position, the massage roller 151 may be disposed such that the first contact portion 151*a* of the massage roller 151 comes in contact with the user's body. The first contact portion 151*a* may come in contact with the user's body by as much as a third contact area smaller than the first contact area.

That is, the first contact portion 151*a* may provide a relatively small contact area to the user, the second contact portion 151*c* may provide a relatively large contact area to the user, and the third contact portion 152*b* may provide an intermediate contact area to the user. The user may select a desired extent of contact area by appropriately rotating the tilt drive shaft 140.

Although the disclosure has been shown and described in relation to specific embodiments, it would be appreciated by those skilled in the art that changes and modifications may be made in these embodiments without departing from the principles and scope of the invention, the scope of which is defined in the claims and their equivalents.

The invention claimed is:

1. A massage apparatus comprising:

a module drive motor;

a module motion shaft provided to rotate by a driving force of the module drive motor;

a motion guider provided to move in an extension direction of the module motion shaft as the module motion shaft rotates;

a tilt drive motor;

a tilt drive shaft arranged in parallel with the module motion shaft, and provided to rotate by a driving force of the tilt drive motor;

a rotation axis tilting member coupled to the tilt drive shaft to rotate together with the tilt drive shaft, the rotation axis tilting member including a tilting portion having a rotation axis that is inclined with respect to the tilt drive shaft; and a roller bracket rotatably supporting a massage roller and connected to the motion guider and the rotation axis tilting member, wherein the massage roller is configured to:

move along the extension direction of the module motion shaft within a first moving range in accordance with a moving range of the motion guider, and move within a second moving range wider than the first moving range in response to rotation of the tilting portion.

2. The massage apparatus of claim 1, wherein the massage roller is provided such that an area configured to be in contact with a body of a user changes as the tilt drive shaft rotates.

3. The massage apparatus of claim 1, wherein the massage roller is provided in a rotational symmetrical shape around a rotation axis of the massage roller.

4. The massage apparatus of claim 3, wherein the massage roller includes:

a first contact portion provided at a first end in a direction in which the rotation axis extends;

a second contact portion provided at a second end, opposite of the first end, in the direction in which the rotation axis extends; and a third contact portion provided between the first contact portion and the second contact portion.

5. The massage apparatus of claim 4, wherein the first contact portion is provided such that an outer diameter thereof increases in a direction from the first end to the second end of the massage roller, the second contact portion is provided such that an outer diameter thereof decreases in the direction from the first end to the second end of the massage roller, and the third contact portion is provided such that an outer diameter thereof is constant in the direction from the first end to the second end of the massage roller.

6. The massage apparatus of claim 1, wherein the module motion shaft includes a screw thread formed on an outer circumferential surface thereof, and the motion guider includes an inner circumferential surface provided to be engaged with the screw thread.

7. The massage apparatus of claim 1, further comprising:

a rotation driver motor;

a rotation drive shaft provided to rotate by a driving force of the rotation drive motor; and a side frame provided to rotate in response to the rotation of the rotation drive shaft, wherein the massage roller is provided to rotate about the module motion shaft as the side frame rotates.

8. The massage apparatus of claim 7, wherein the massage roller is provided to:

move forward as the side frame rotates in a first direction; and move rearward as the side frame rotates in a second direction opposite to the first direction.

9. The massage apparatus of claim 8, wherein the module motion shaft and the tilt drive shaft are coupled to the side frame.

10. The massage apparatus of claim 1, further comprising a controller configured to operate the module drive motor and the tilt drive motor.

11. The massage apparatus of claim 10, further comprising a manipulator configured to receive an input signal from a user and to provide the input signal to the controller.

12. The massage apparatus of claim 11, wherein the manipulator is disposed on a housing of the massage apparatus.

* * * * *